(12) United States Patent
Mahrla

(10) Patent No.: US 7,948,116 B2
(45) Date of Patent: May 24, 2011

(54) METHOD AND APPARATUS FOR CONTROLLING A SUPPLY CURRENT FOR A CIRCUIT OR A PLURALITY OF CIRCUIT BLOCKS

(75) Inventor: Peter Mahrla, Zorneding (DE)

(73) Assignee: Infineon Technologies AG, Neubiberg (DE)

( * ) Notice: Subject to any disclaimer, the term of this patent is extended or adjusted under 35 U.S.C. 154(b) by 187 days.

(21) Appl. No.: 11/753,870

(22) Filed: May 25, 2007

(65) Prior Publication Data

US 2008/0290847 A1    Nov. 27, 2008

(51) Int. Cl.
 *H02J 3/38* (2006.01)
 *G05F 1/00* (2006.01)
 *H03B 19/00* (2006.01)
(52) U.S. Cl. .................. 307/52; 323/283; 327/113
(58) Field of Classification Search .......... 307/52; 323/283; 327/113
 See application file for complete search history.

(56) References Cited

U.S. PATENT DOCUMENTS

| | | | | |
|---|---|---|---|---|
| 5,220,201 A * | 6/1993 | Kawasaki et al. | | 327/156 |
| 6,294,905 B1 * | 9/2001 | Schwartz | | 323/288 |
| 6,545,451 B2 * | 4/2003 | Jung | | 323/283 |
| 6,949,918 B2 * | 9/2005 | Clark et al. | | 323/351 |
| 7,098,555 B2 * | 8/2006 | Glahn et al. | | 307/32 |
| 7,109,695 B2 * | 9/2006 | King | | 323/283 |
| 7,245,167 B2 * | 7/2007 | Mahrla | | 327/291 |
| 7,489,117 B2 * | 2/2009 | Jain | | 323/224 |
| 2004/0027106 A1 * | 2/2004 | Martins | | 323/282 |
| 2005/0212496 A1 * | 9/2005 | Sutardja | | 323/222 |

* cited by examiner

*Primary Examiner* — Michael Rutland Wallis
(74) *Attorney, Agent, or Firm* — Eschweiler & Associates, LLC

(57) ABSTRACT

A method for controlling a supply current for a circuit comprises setting a target value of a quantity related to a supply current, said target value being different from a presently established value of the quantity, and adjusting the quantity until a value of the quantity corresponds to the target value. A method for controlling a supply current to a plurality of circuit blocks comprises providing a plurality of partial supply currents to the plurality of circuit blocks, setting at least one target value of a quantity related to at least one of the partial supply currents, checking whether a predetermined condition which depends on the at least one set target value is achieved, and if the predetermined condition is not achieved, changing at least one among the at least one target values and the at least one partial supply currents to achieve the predetermined condition.

13 Claims, 8 Drawing Sheets

METHOD AND APPARATUS FOR CONTROLLING A SUPPLY CURRENT FOR A CIRCUIT OR A PLURALITY OF CIRCUIT BLOCKS

FIELD OF THE INVENTION

The present invention relates to a method and an apparatus for controlling a supply current for a circuit and a method and an apparatus for controlling a supply current for a plurality of circuit blocks.

BACKGROUND OF THE INVENTION

In current digital circuits the supply current varies widely depending upon the operating states of the circuit. Especially in circuits for portable devices current consumption has to be minimized during idle phases of the system. All parts of the system reduce their current consumption as long as no data processing is required to reduce the current drawn from the battery. When data processing restarts the current consumption rises sharply. By reducing the idle mode current in all parts of the system, the current step caused by the return to an active state is increased.

A similar change of supply current can occur when data processing stops. Processor cores can enter a wait-for-interrupt state and generate a signal permitting turn-off of the clock to the major part of the processor core. Only a small part containing the interrupt handling logic remains clocked. Similar functions are often provided by signal processing blocks.

In current portable systems many sources can trigger the restart of data processing in different parts of the circuit, e.g. a keypad interrupt or a signal received via network link. These events occur completely asynchronously to each other and may in rare cases trigger a simultaneous step in the current consumption in all parts of the system. This type of extreme current surge has to be handled by the voltage regulator supplying the voltage of the device.

The voltage regulator has to maintain the supply voltage within a very narrow voltage tolerance range and has to minimize under- and overshoots of the supply voltage. The minimum supply voltage is usually defined by the performance requirements of the supplied circuit, the maximum supply voltage may be defined by technological limits. Furthermore minimizing the supply voltage reduces the power consumption of the circuit.

Selecting large output capacitors and optimizing the design of the voltage regulator are standard approaches to minimize supply voltage transients presently used. Large output capacitors, however, increase the cost and the board footprint of the voltage regulator circuitry. Optimizing the voltage regulator for minimum voltage transients often requires higher quiescent currents and thereby reduced power efficiency of the voltage regulators. In most cases a significant supply voltage tolerance will be unavoidable which often requires a reduction of the minimum supply voltage. Thereby the achievable performance of the circuit is reduced.

BRIEF DESCRIPTION OF THE DRAWINGS

Aspects of the invention are made more evident in the following detailed description of some embodiments when read in conjunction with the attached drawing figures, wherein.

DETAILED DESCRIPTION OF THE INVENTION

Figure 1:
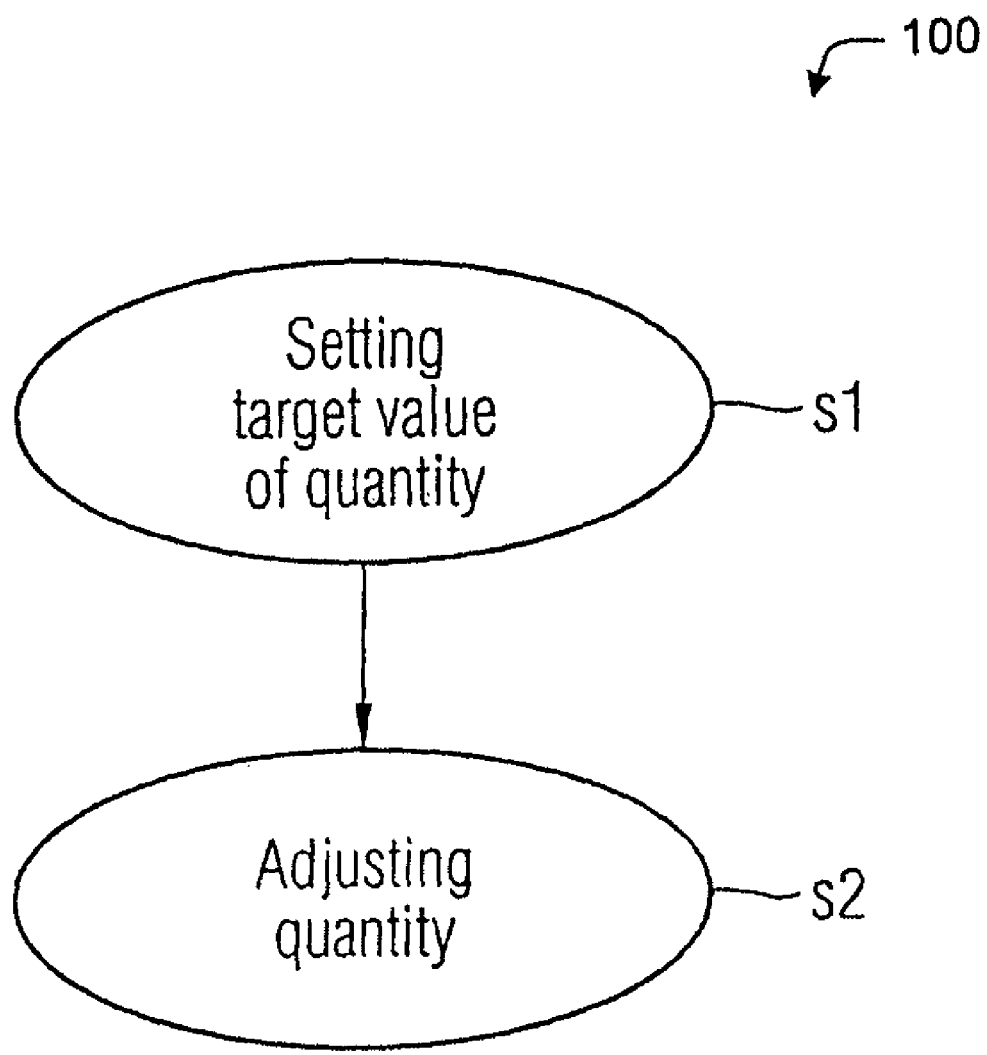
FIG. 1 shows a flow diagram of an embodiment of a method for controlling a supply current for a circuit.

The aspects and embodiments of the invention are now described with reference to the drawings, wherein like reference numerals are generally utilized to refer to like elements throughout. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Referring to FIG. 1, there is shown a flow diagram of an embodiment of a method 100 for controlling a supply current for a circuit. In a step s1 a target value of a quantity is set, wherein the quantity is related to a supply current and the target value may be different from a presently established value of the quantity. In a step s2 the quantity is adjusted until the present or actual value of the quantity corresponds to the target value.

Figure 2:
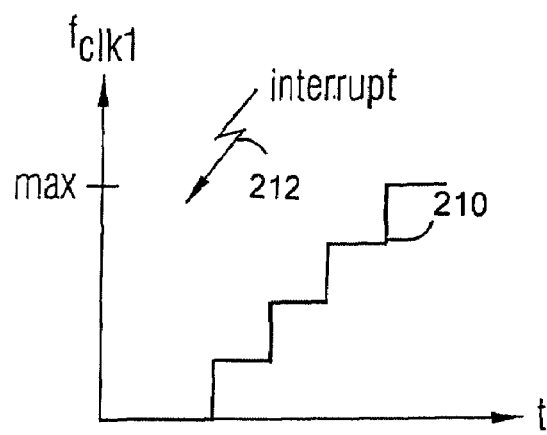
FIG. 2 shows a further embodiment of a method for controlling a supply current for a circuit by depicting the time dependency of the clock frequency, the supply current and the supply voltage VDD.
Figure 2:
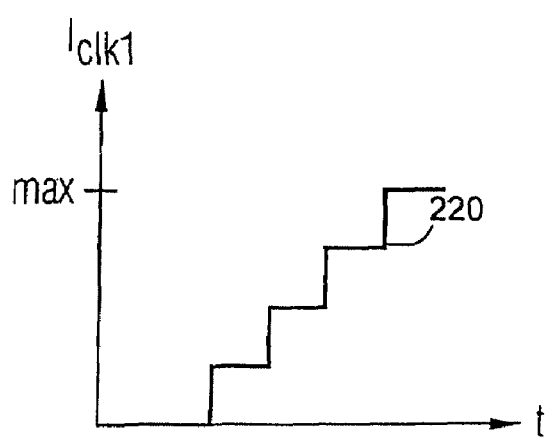
Figure 2:
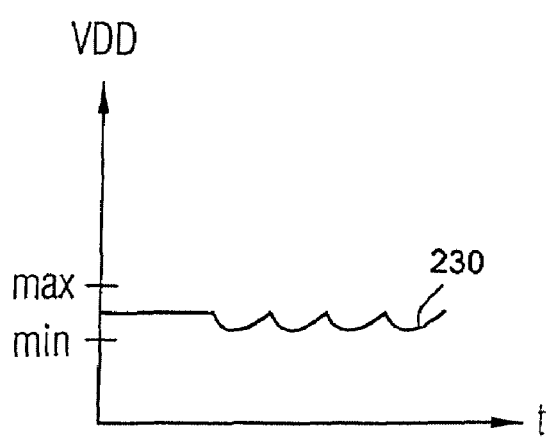

Referring to FIG. 2, there are shown timing diagrams of the clock frequency $f_{clk1}$ (210), the supply current $I_{clk1}$ (220), and the supply voltage VDD (230), for illustrating a further embodiment of a method for controlling a supply current for a circuit, wherein the aforesaid quantities are supplied to one particular circuit or circuit block.

By controlling the currents in the circuit it is possible to limit current surge and load dumps thereby alleviating the voltage transients. The supply current drawn by a circuit block usually comprises a static current which is substantially time invariant and a dynamic current which is generally proportional to the clock frequency of the clock supplied to the circuit block. All short term current changes can be therefore controlled by controlling the clock frequency. If the circuit is supplied by more than one clock, several current contributions may often be added, each of which again are generally proportional to the frequency of one of the clocks.

For each power supply domain supplied by its dedicated voltage regulator, an interrupt and clock frequency control circuit may be required. Whenever an interrupt or a frequency request occurs it calculates an estimate for the expected current surge. Rather than stepping up the clock in one step to its target value, it ramps up the clock frequency in several steps. For example, the time diagrams of $f_{clk1}$ 210 and $I_{clk1}$ 220 of FIG. 2 illustrate a situation where the clock is turned off completely during the wait for an interrupt phase. By choosing four clock frequency $f_{clk1}$ 210 steps instead of one, the current $I_{clk1}$ 220 increases in similar steps. Thereby the transient of the supply voltage Vdd 230 is held within the bounds of a maximum and a minimum value of the supply voltage VDD 230 and a violation of the minimum required supply voltage value is avoided.

The clock frequency and thus also the supply current may be changed at equally spaced times or time intervals, as shown in the embodiment of FIG. 2. Also the amounts of change (e.g., step height) of the clock frequency and thus also the amounts of change or step heights of the supply current may also be equal, as shown in the embodiment of FIG. 2. This can be achieved, for example, by setting a target value of the clock frequency upon receipt of the interrupt signal or a request signal requesting for a particular target supply current, calculating a difference between the presently established or actual value of the clock frequency and the set target value, and dividing the calculated difference by the number of the steps, i.e. dividing by an integer which may be greater than or equal to 2 according to the embodiment of FIG. 2.

Figure 3A:
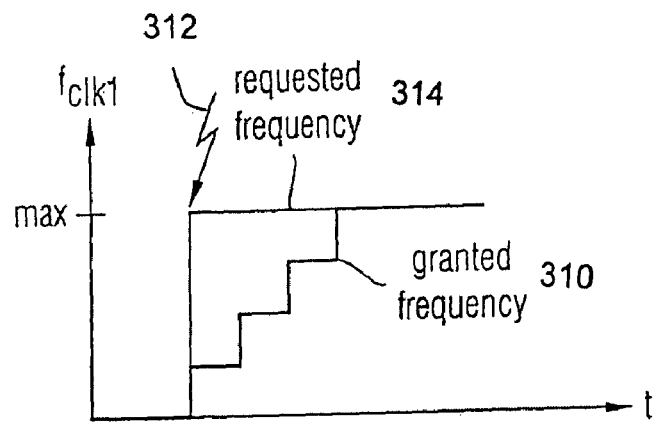
FIGS. 3a and b show a further embodiment of a method for controlling a supply current for a circuit by depicting the time dependency of the clock frequencies of two circuit blocks upon simultaneous requests (3a) and successive requests (3b)
Figure 3A:
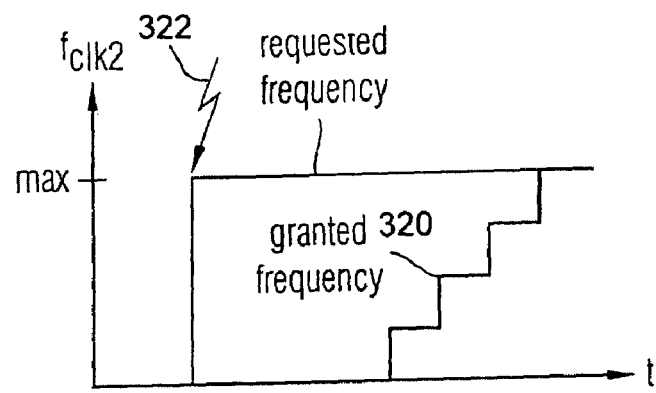
Figure 3B:
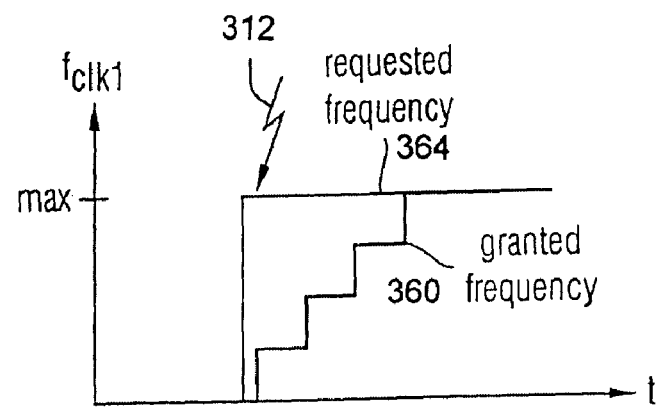
Figure 3B:
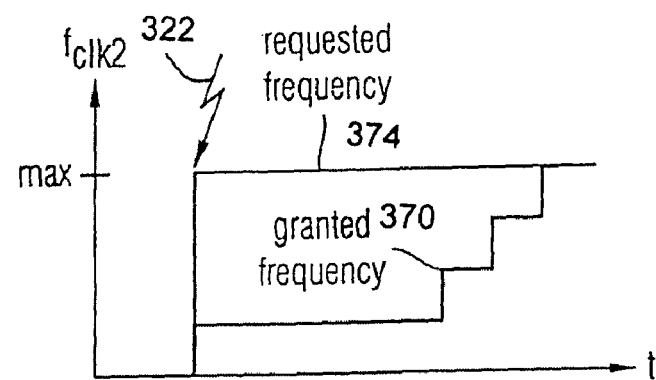

Referring to FIGS. 3a and b, there are shown timing diagrams of the clock frequencies $f_{clk1}$ 310 and $f_{clk2}$ 320 to two different circuit blocks for illustrating a further embodiment of a method for controlling a supply current for a circuit. If interrupts (e.g., 312 and 322) to several blocks of the circuit occur simultaneously (FIG. 3a), the frequency ramp-up for these blocks can be done sequentially. Frequency $f_{clk1}$ supplied to circuit block 1 is ramped-up first. After this $f_{clk1}$ ramp-up has been completed frequency $f_{clk2}$ to circuit block 2 is ramped-up. This type of handling may be beneficial if the interrupt handling of circuit block 1 is substantially more real-time critical than the interrupt handling of circuit block 2. If the interrupt 312 of circuit block 1 occurs after the interrupt 322 of circuit block 2 (FIG. 3b), the clock ramp-up of circuit block 2 may be temporarily delayed until the frequency of circuit block 1 has been ramped-up, as shown in FIG. 3b. The first ramp step is done on circuit block 2, all further steps may then be delayed until the ramp on circuit block 1 has been completed.

Figure 4:
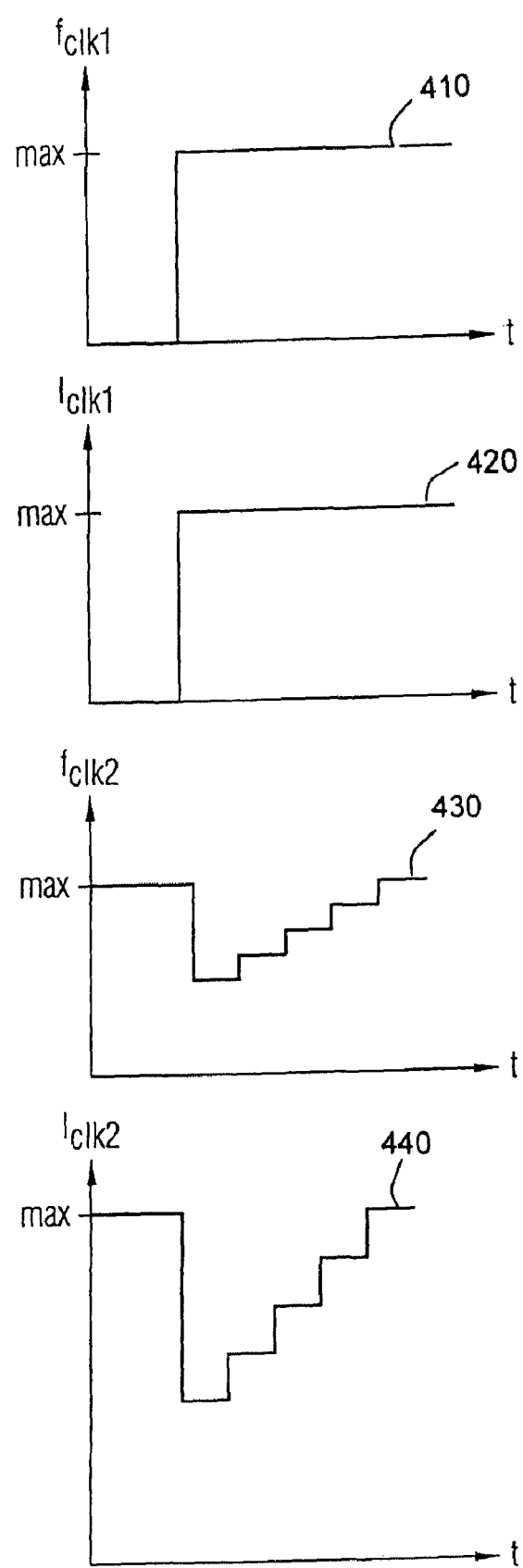
FIG. 4 shows a further embodiment of a method for controlling a supply current for two circuit blocks comprising first and second circuit blocks, by depicting the time dependencies of the clock frequency and the partial supply current for the first circuit block and the clock frequency and the partial supply current for the second circuit block.

Referring to FIG. 4, there are shown timing diagrams of the clock frequency $f_{clk1}$ 410 and the supply current $I_{clk1}$ 420 for a circuit block 1 and the clock frequency $f_{clk2}$ 430 and the supply current $I_{clk2}$ 440 for a circuit block 2, illustrating a further embodiment of a method for controlling a supply current for a circuit. This embodiment shows that the clock frequency in other parts of the circuit may be temporarily reduced as shown in FIG. 3 where the clock frequency $f_{clk1}$ 410 of circuit block 1 is increased and the clock frequency $f_{clk2}$ 430 of circuit block 2 is simultaneously decreased and ramped-up stepwise thereafter. Thereby, the step in the resulting total current $I_{clk1}$ 420+$I_{clk2}$ 440 is significantly reduced. As will be explained later, FIG. 3 illustrates a situation in which it is determined that the intended step of the current $I_{clk1}$ 220 would for itself violate a predetermined condition, namely a condition regarding the maximum instantaneous increase of the total supply current. Accordingly, the supply current of another circuit, in the present circuit block 2, is reduced so that the predetermined condition can be met.

Similarly, after completion of a processing, the clock frequency may not be turned off immediately but may be still supplied for a limited time to avoid a downward step in current consumption. Thus, the current consumption drops from a high active value to an intermediate idle mode value. After an additional delay the clock will be turned off completely.

The interrupts and tasks of the system can be weighted by their real-time constraints. Interrupts handling real-time critical tasks may be run continuously at a full frequency while other interrupts may easily tolerate higher delays. The same is true for tasks controlled by the operating system. With most interactive tasks, for example, tasks where the user of the device expects a reaction of the device to an input, a delay on the order of less than about 1 µs may not be noticed by the user. Therefore, these tasks permit reduction of the clock frequency. The operating system may flag the criticality of a task by setting a bit in a control register evaluated by a central clock control unit.

The estimate of a current change is done based upon values gained by power simulation or by power measurements. The supply current of a circuit block depends upon its operating mode and is usually proportional to the clock frequency. For most blocks a specific supply current value e.g. in mA/MHz can be defined for each operating mode. The supply current can be calculated from this value by multiplying it with the clock frequency. For each block a set of specific supply currents can be determined and stored in a non-volatile memory. Values may be determined for several operating modes of the block. One value is usually determined for idle mode of the block where only the clock is turned on but no processing occurs. Other values may be specific for different active operating modes of the block. For a processor core, for example, different values may be determined for control tasks and digital signal processing tasks. Different interrupt routines or tasks may also show different supply current requirements. If a block is supplied by several blocks the specific current values may have to be determined for each clock and the current contributions added. If voltage scaling is used the current may also depend upon the supply voltage. This dependency can be easily taken into account since the current usually will scale linearly with the supply voltage and the control usually will be done by on-chip hardware or by the software running on the central processing unit (CPU). Giving the clock control circuitry access to such voltage setting data permits the calculation of a current that depends upon its supply voltage.

Figure 5:
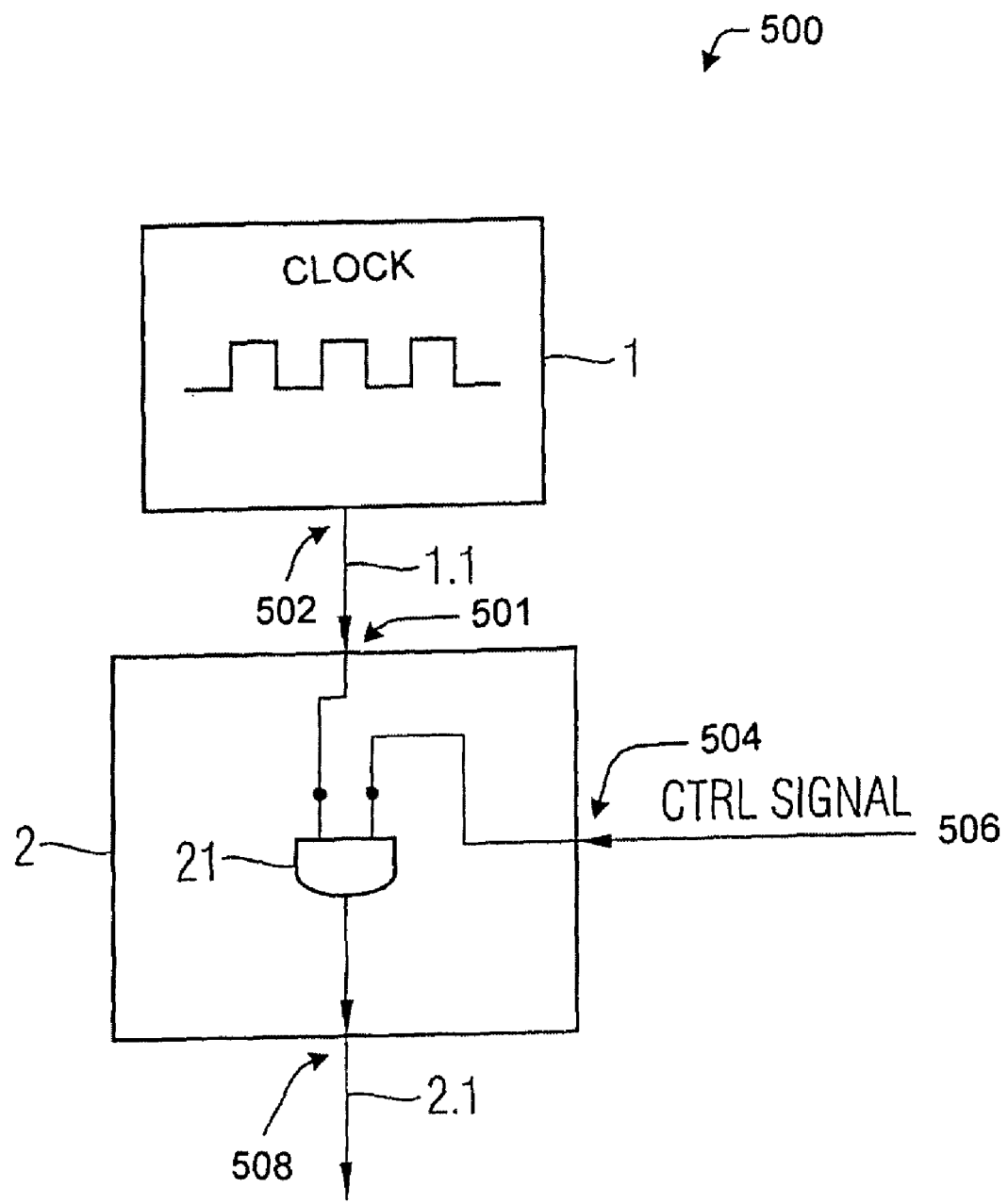
FIG. 5 shows a block diagram of an embodiment of an apparatus for controlling a supply current for a circuit.

Referring to FIG. 5, there is shown an embodiment of an apparatus 500 for controlling a supply current for a circuit in a block diagram form. The apparatus 500 comprises a clock frequency generator 1 for generating an output signal 1.1 comprising, for example, a continuous pulse train of clock pulses. The clock pulse train comprising a clock frequency which is the inverse of the time interval between two succeeding clock pulses. The clock pulse train is supplied to a device 2 for changing the clock frequency of the clock pulse train. The device 2 comprises a first input 501 which is coupled to the output 502 of the clock frequency generator 1. The device 2 further comprises a second input 504 for inputting a control signal 506. The control signal 506 determines the change of the clock frequency of the input pulse train. The device 2 comprises an output 508 for outputting a signal 2.1 comprising a changed clock frequency. The signal 2.1 is then delivered to a circuit.

One example to control the clock frequency of the signal 1.1 is by using "pulse swallowing". Pulse swallowing can be implemented by gating the clock signal with an AND gate 21. The AND gate 21 comprises a first input coupled to the first input 501 of the device 2 and a second input coupled to the second input 504 of the device 2 and an output coupled to the output 508 of the device 2. Thus, the first input of the AND gate 21 is supplied with the signal 1.1 having the output clock frequency of the clock frequency generator 1 and the second input of the AND gate 21 is supplied with the control signal 506. By utilizing pulse swallowing, an arbitrary number of pulses can be removed from the clock pulse train. Thereby the clock frequency can be increased or decreased gradually. If, for example, 16 pulses are used as references, the current consumption can be increased or decreased stepwise with a step width of $1/16$ of a maximum current. Since the time constant of a voltage regulator may be typically about 10 μs, applying this pulse swallowing scheme to a clock of about 100 MHz will give sufficient time averaging with respect to the time constant of the regulator. Even at a maximum pulse swallowing setting with only one pulse out of 16 remaining, the current consumption will show a ripple of about 6 MHz with a period of $1/6$ μs, that is well below the time constant of the regulator. Thus, the output signal 2.1 will comprise an average changed clock frequency 2.1 as determined by the control signal 506.

Figure 6:
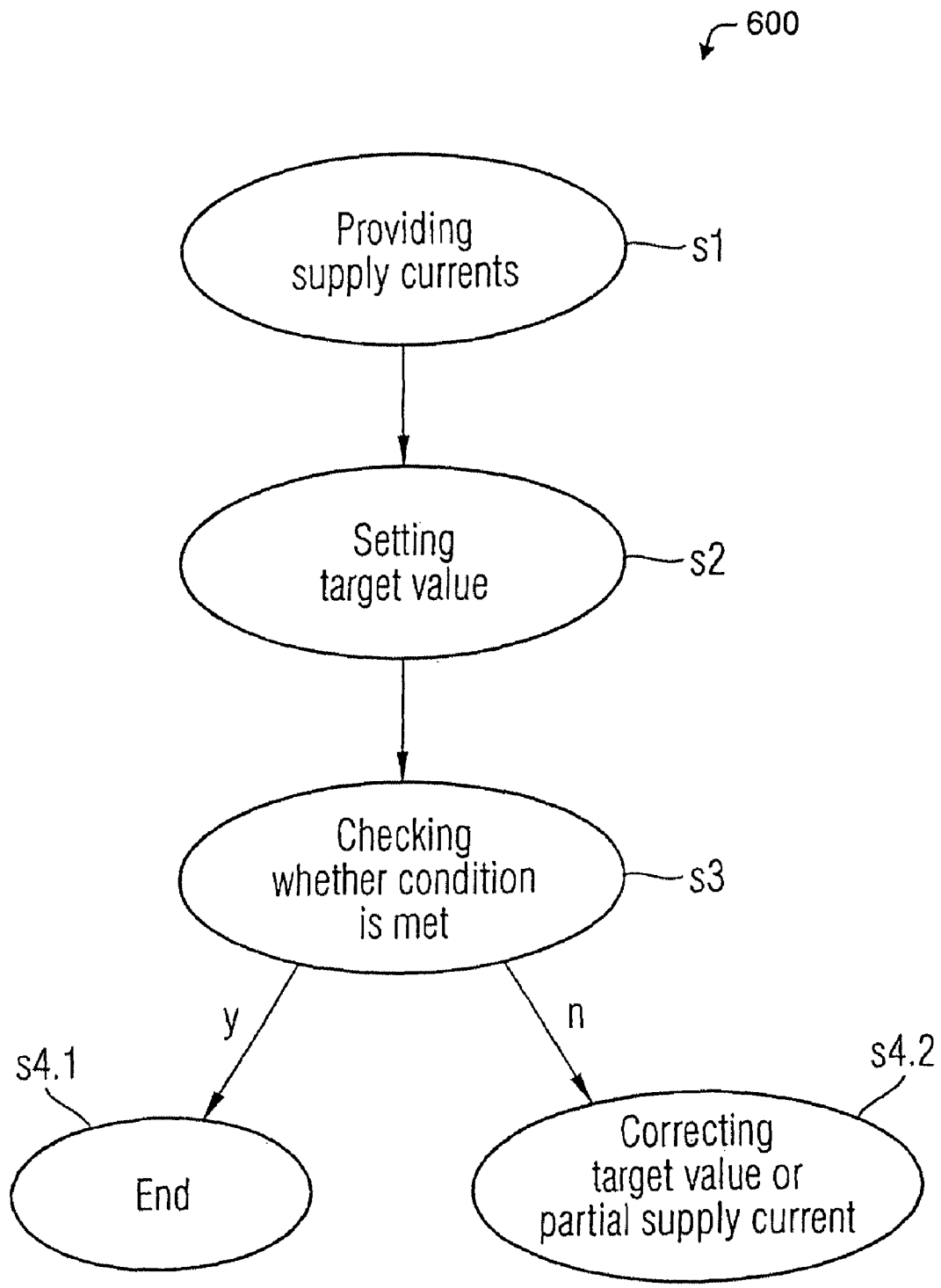
FIG. 6 shows a flow diagram for an embodiment for a method for controlling a supply current for a plurality of circuit blocks.

Referring to FIG. 6, there is shown a flow diagram of an embodiment of a method 600 for controlling a supply current for a plurality of circuit blocks. In a step s1 a plurality of partial supply currents is provided to the plurality of circuit blocks. In a step s2 at least one target value of a quantity is set wherein the quantity is related to at least one of the partial supply currents. In a step s3, for example, a determination is made whether a predetermined condition which depends on the set target values is met or achieved. If the predetermined condition has been met at step s3 the procedure is terminated at a step s4.1. If the predetermined condition has not been achieved at step s3, at least one of the target values or at least one of the partial supply currents is corrected so that the predetermined condition is achieved at a step 4.1.

Figure 7:
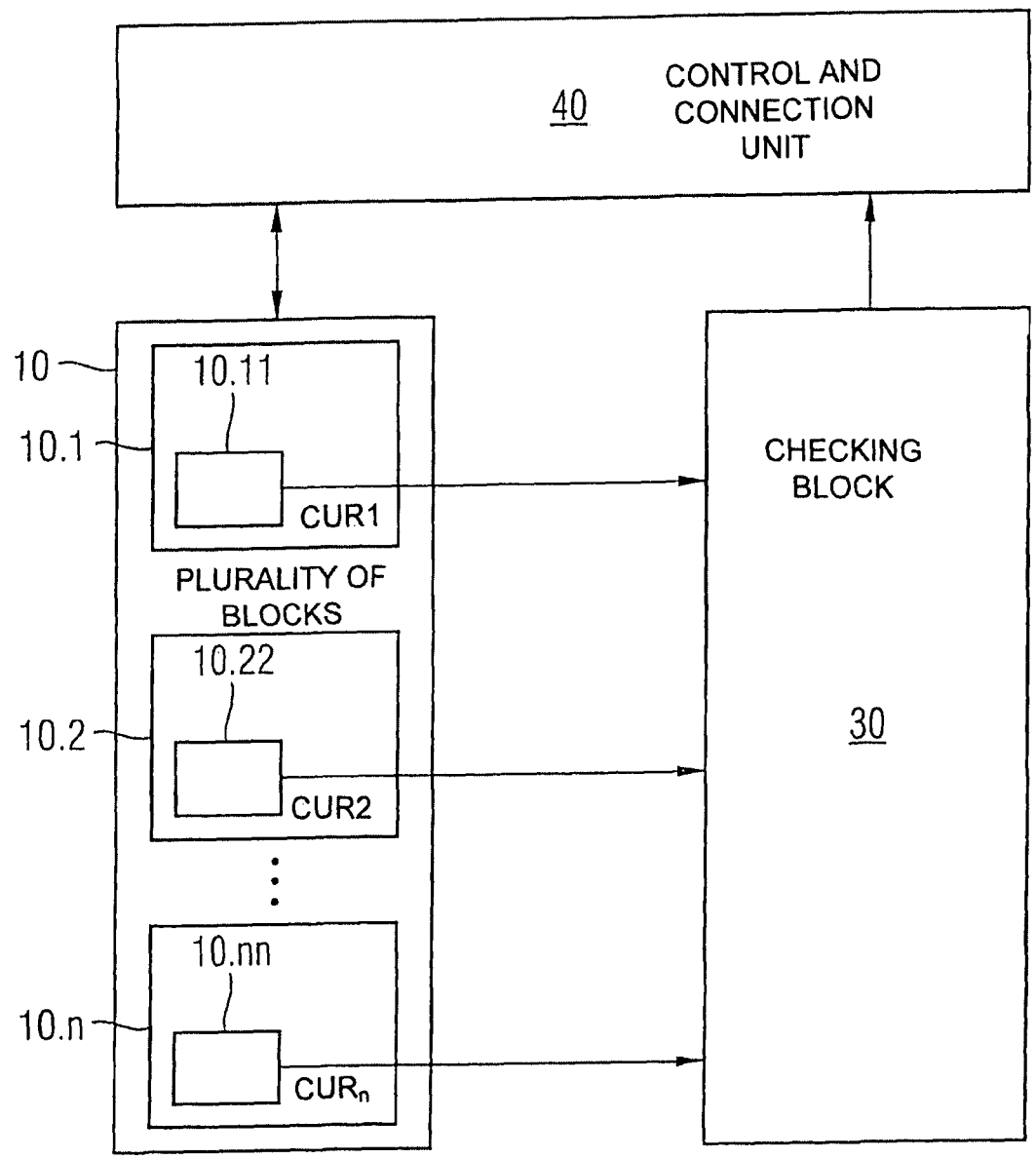
FIG. 7 shows a block diagram of an embodiment of an apparatus for controlling a supply current to a plurality of circuit blocks.

Referring to FIG. 7, there is shown a block diagram of an embodiment of an apparatus 700 for controlling a supply current to a plurality of circuit blocks. The apparatus comprises a plurality 10 of current calculation blocks 10.1, 10.2, . . . , 10.*n* wherein each one of the current calculation blocks 10.1 to 10.*n* is representative of one circuit block of the plurality of circuit blocks for controlling a partial supply current to the respective circuit block. Each one of the current calculation blocks 10.1 to 10.*n* comprises a storage means 10.11, 10.22, . . . , 10.*nn* (e.g., a memory), respectively, for storing a target value of a quantity representative of the partial supply current. The quantity can be given by the clock frequency supplied to the respective circuit block. Whenever a change in clock frequency is required for a circuit block, the new target frequency value is written into the respective storage means 10.11 to 10.*nn*. Thereafter the frequency values stored in the storage means 10.11 to 10.*nn* are supplied to the checking block 30 for checking whether a predetermined condition depending on the target frequency values is met. The predetermined condition may be, for example, that the change of the total supply current is below a predetermined threshold. If the predetermined condition is not met, the checking block 30 delivers a respective signal to a control and correcting unit 40. The control and correcting unit 40 thereupon acts to correct at least one of the target values stored in the storage means 10.11 to 10.*nn* or at least one of the partial supply currents supplied to the circuit blocks so that the predetermined condition is met. Thereafter the clock frequencies can be changed until they reach the respective target values. Reference is made again to the embodiment as illustrated in FIG. 5.

Figure 8:
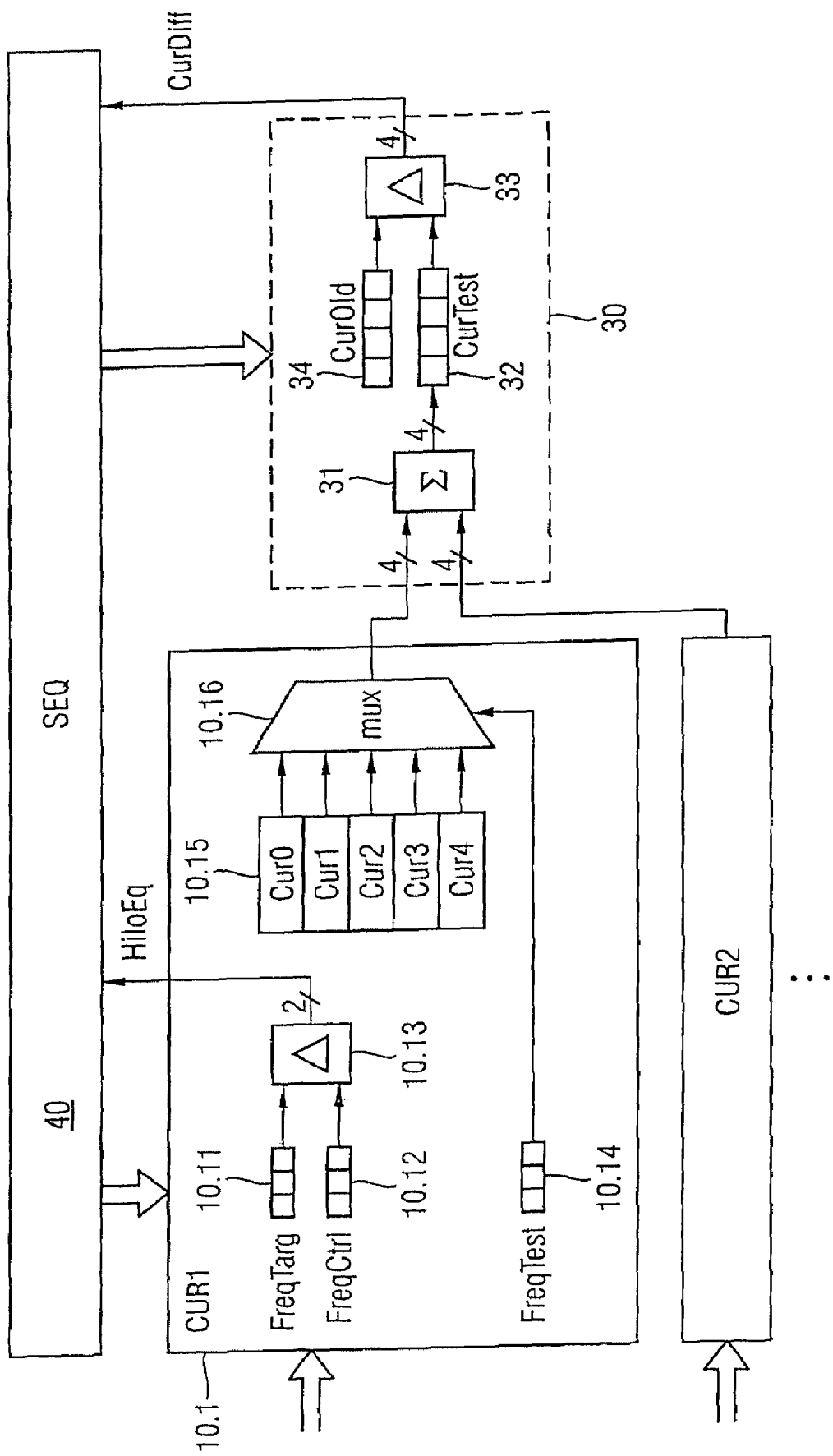
FIG. 8 shows a block diagram of a further embodiment of an apparatus for controlling a supply current to a plurality of circuit blocks.

Referring to FIG. 8, there is shown a block diagram of a further embodiment of an apparatus 800 for controlling a supply current to a plurality of circuit blocks. The embodiment 800 of FIG. 8 is a further development of the embodiment 700 of FIG. 7. In particular, the current calculation unit 10.1 and the checking block 30 are shown in greater detail in FIG. 8. Again, each circuit block has its associated current calculation unit (CUR1, CUR2) 10.1, 10.2, . . . , 10.*n*. All current calculation units 10.1 to 10.*n* may have, for example, identical structures. In the embodiment as shown in FIG. 8 the quantity representative of the supply current is the clock frequency supplied to the respective circuit block. Circuit blocks with more than one clock have, for example, one current calculation unit for each clock. The clock frequency of each circuit block is controlled by the frequency control value in the frequency control register (FreqCtrl) 10.12 of its associated current calculation block 10.1. The frequency control values used in this embodiment 800 may be selected such that a higher control value corresponds to a higher clock frequency. Whenever a change in clock frequency is required for a circuit block, the new target frequency control value is written to the frequency target register (FreqTarg) 10.11 of its associated current calculation block 10.1 wherein the frequency target register 10.11 is an embodiment of the storage means 10.11 as depicted in FIG. 7. This write operation may be either triggered by hardware means, for example, as a result of an interrupt or by software means running on a central processing unit (CPU), for example.

In the current calculation unit 10.1 the value of the frequency target register 10.11 is compared with the value stored in the frequency control register 10.12 in a first comparator 10.13. If both register values differ, the deviation is signaled to the control and correcting unit or sequencer (SEQ) 40 via signal HiLoEq 802.

The control and correcting unit 40 prioritizes all frequency change requests, for example, according to the real time requirements of the associated circuit block. As long as at least one request is pending, a frequency adjustment procedure is run repeatedly at fixed predefined time intervals. In this frequency adjustment procedure the contents of the frequency target register 10.11 is copied to the frequency test register (FreqTest) 10.14. The current calculation block 10.1 calculates the current associated with the new frequency by selecting the corresponding current value Cur_i (i=1, 2, . . . ) from a set of pre-configured values stored in registers 10.15 or in a memory. The frequency test register 10.14 is coupled to a multiplexer 10.16 which receives the current values Cur_i from the current value registers 10.15 and outputs the current value corresponding to the frequency value delivered by the frequency test register 10.14.

The current values thus delivered by all current calculation units 10.1 to 10.*n* are supplied to an adder 31 wherein they are summed together and written to a current test register (CurTest) 32. The value of this current test register 32 is supplied to a second comparator 33 which is also provided with the value stored in a current old register (CurOld) 34. The second comparator 33 calculates the difference between both values (e.g., between CurTest 32 and CurOld 34) and forwards the difference value to the control and correcting unit 40 via the signal CurDiff 804.

There is a predefined limit value for the maximum permissible current increase and current decrease stored within the control and correcting unit 40. If the calculated current change exceeds this value, the control and correcting unit 40 adjusts (e.g., via output 810) the contents of the frequency test registers 10.14, 10.24, . . . , 10.n4 in such a way that the resulting current change as signaled by the signal CurDiff 804 remains below the predefined limit and the frequency targets are substantially met. After this adjustment has been achieved, all modified values of the frequency test registers 10.14 to 10.n4 are transferred to the corresponding frequency control registers 10.12 to 10.n2 and the value stored in the current test register 32 is copied to the current old register (CurOld) 34, for example, from the control and correcting unit 40 via output 820. Thus, the value stored in the current old register 34 corresponds to the actual total supply current.

Thereafter, the control and correcting unit 40 is configured to wait for a predefined time interval before the next frequency adjustment operation is started. The interval is chosen to fit to the time constant of the voltage regulator, that is, for example, 10 μs. The maximum current change value used by the control and correcting unit 40 is given by the maximum change of current which can be tolerated by the voltage regulator within this time interval without violating the supply voltage tolerance specification of the circuit.

Other strategies may be chosen for the adjustment of the values in the frequency test registers 10.14 to 10.n4. If the current increase is too high after the frequency request of all blocks have been placed in the frequency test registers 10.14 to 10.n4, for example, all current increase requests may be successively reduced by decrementing the values in the frequency test registers 10.14 to 10.n4. The sequence of modification may be placed in ascending real time priority, that is, the modification may start with the lowest priority block. The procedure may continue in this manner until the increase limit is met. If, however, a current decreases, the same procedure may be applied, except that current decreases replace the current increases.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the scope of equivalents to which such claims are entitled.

It is emphasized that the Abstract is provided to comply with 37 C.F.R. section 1.72(b) requiring an abstract that will allow the reader to quickly ascertain the nature and gist of the technical disclosure. It is submitted with the understanding, that it will not be used to interpret or limit the scope or meaning of the claims.

What is claimed is:

1. A method for controlling a supply current for a circuit, comprising:
    providing the supply current to a circuit;
    setting a target value of a quantity, wherein the quantity differs from the supply current, wherein the quantity is supplied to the circuit, and wherein the supply current is dependent on the quantity and wherein the target value is different from a presently established value of the quantity by a difference amount; and
    adjusting the quantity by adding or subtracting predetermined amounts less than the difference amount to the quantity over time until the value of the quantity corresponds to the target value, wherein the supply current changes in response to a quantity adjustment.

2. The method according to claim 1, wherein the quantity is adjusted in a stepwise manner over time.

3. The method according to claim 1, wherein the quantity comprises a clock frequency.

4. The method according to claim 1, wherein the predetermined amounts are equal.

5. The method according to claim 4, further comprising
    adjusting the predetermined amounts by calculating the difference amount between the presently established value of the quantity and the target value of the quantity; and
    dividing the calculated difference amount by an integer.

6. The method according to claim 1, wherein the quantity is adjusted at equally spaced times.

7. The method according to claim 1, further comprising:
    providing a supply current to the circuit comprising a static, time-invariant component and a dynamic time-varying component, wherein the dynamic component of the supply current is changed over time.

8. A method for controlling a supply current for a circuit, comprising:
    providing the supply current to a circuit;
    setting a target value of a quantity, wherein the quantity differs from the supply current, wherein the quantity is supplied to the circuit, and wherein the supply current is dependent on the quantity and wherein the target value is different from a presently established value of the quantity by a difference amount; and
    adjusting the quantity by an amount less than the difference amount until the value of the quantity corresponds to the target value, wherein the supply current changes in response to a quantity adjustment;
    wherein setting the target value of the quantity comprises setting a target value of a clock frequency; and
    wherein adjusting the quantity comprises adjusting the clock frequency in a stepwise manner.

9. The method according to claim 1, wherein the target value of the quantity is set upon receipt of a request for adjusting the quantity.

10. The method according to claim 1, wherein in addition to controlling the supply current for the circuit, controlling at least one further quantity for a second circuit.

11. The method of claim 1, wherein adjusting the quantity comprises stepping the value of the quantity to at least one intermediate value between the presently established value of the quantity and the target value.

12. The method according to claim 8, wherein the adjusting the clock frequency comprises adding or removing clock pulses to or from a clock pulse train.

13. The method according to claim 9, wherein upon receiving a first request for adjusting a first quantity for a first circuit and receiving a second request for adjusting a second quantity for a second circuit, adjusting the first quantity of the first circuit before adjusting the second quantity of the second circuit.

* * * * *